United States Patent
Koehler et al.

(10) Patent No.: US 7,314,555 B2
(45) Date of Patent: Jan. 1, 2008

(54) FILTER CARTRIDGE FOR A FILTER ASSEMBLY

(75) Inventors: Stan M. Koehler, Eden Prairie, MN (US); Brent A. Gulsvig, Faribault, MN (US); John R. Hacker, Edina, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 260 days.

(21) Appl. No.: 10/474,136

(22) PCT Filed: Apr. 2, 2002

(86) PCT No.: PCT/US02/10298

§ 371 (c)(1),
(2), (4) Date: Oct. 7, 2004

(87) PCT Pub. No.: WO02/081052

PCT Pub. Date: Oct. 17, 2002

(65) Prior Publication Data

US 2006/0196822 A1 Sep. 7, 2006

Related U.S. Application Data

(60) Provisional application No. 60/280,787, filed on Apr. 2, 2001.

(51) Int. Cl.
*B01D 21/00* (2006.01)

(52) U.S. Cl. .................. 210/299; 210/298; 210/450

(58) Field of Classification Search ................ 210/437, 210/455, 450; 229/230, 160.1; 55/493
See application file for complete search history.

(56) References Cited

U.S. PATENT DOCUMENTS

| | | | |
|---|---|---|---|
| 5,527,463 A * | 6/1996 | Morgan, Jr. ................. | 210/450 |
| 5,718,825 A * | 2/1998 | Greive et al. ............... | 210/298 |
| 5,738,785 A * | 4/1998 | Brown et al. ............... | 210/232 |
| 6,235,194 B1 * | 5/2001 | Jousset ....................... | 210/206 |
| 6,322,697 B1 * | 11/2001 | Hacker et al. .............. | 210/248 |
| 7,094,343 B2 * | 8/2006 | Moessinger et al. ........ | 210/298 |

FOREIGN PATENT DOCUMENTS

| | | |
|---|---|---|
| DE | 196 18 166 | 11/1997 |
| WO | WO 01/05485 | 1/2001 |

* cited by examiner

*Primary Examiner*—Krishnan Menon
*Assistant Examiner*—Benjamin Kurtz
(74) *Attorney, Agent, or Firm*—Merchant & Gould, P.C.

(57) ABSTRACT

A filter assembly including a replaceable filter cartridge for use with a reusable filter canister. The filter cartridge includes a cylindrical filter media having top and bottom ends respectively mounted within top and bottom end caps. The bottom end cap includes a sidewall that surrounds at least a lower portion of the filter media. A contaminant containment chamber is defined between the sidewall and an outer side of the filter media. When the cartridge is mounted within the canister, the radial sealing element engages an inner surface of the canister to provide a circumferential seal. The sidewall also includes a living hinge positioned below the sealing element.

15 Claims, 13 Drawing Sheets

FILTER CARTRIDGE FOR A FILTER ASSEMBLY

This application is being filed as a PCT international patent application in the name of Donaldson Company, Inc., a U.S. corporation (applicant for all designations except the U.S.), and in the names of the Stan M. Koehler, Brent A. Gulsvig, and John R. Hacker, all U.S. citizens and residents (applicants for the U.S. designation only), on Apr. 2, 2002, designating all countries.

FIELD OF THE INVENTION

The present invention relates generally to filters. More particularly, the present invention relates to liquid filters (e.g., hydraulic fluid filters, engine oil filters or fuel filters) having replaceable filter elements (i.e., filter cartridges).

BACKGROUND OF THE INVENTION

Although applicable to a number of fields, the present invention relates primarily to liquid filters such as hydraulic oil filters or engine oil filters. Filters have long been used to remove contaminants from oil. It is well known that, with time, oil filters become plugged or clogged with contaminants and are required to be replaced.

A typical oil filter assembly includes a housing (e.g., a bowl or canister) containing a cylindrical filter element. The cylindrical filter element typically defines a central longitudinal opening in which a central core is mounted. The core provides support for preventing the filter element from collapsing inward during use. In use, oil is directed from a system into an annular channel defined between the housing and the outer surface of the filter element. Pressure from the system forces the oil from the annular flow passage, through the filter element, and into the central opening of the filter element. From the central opening of the filter element, the filtered oil is discharged from the filter assembly.

Disposable or "throw-away" type fluid filters are well known in the art. In this type of filter assembly, the filter element is permanently sealed within the housing. When the filter element becomes clogged with contaminants, the entire filter assembly is discarded and replaced with a new unit.

Oil filter assemblies having replaceable filter elements are also known in the art. Filter assemblies with replaceable filter elements are desirable because the housing can be reused thereby reducing the amount of waste that enters the waste stream. Consequently, as landfill costs increase, filter assemblies having replaceable filter elements will become increasingly more desirable.

Contamination is an important consideration relating to filter assemblies having replaceable filter elements. For example, prior art systems having replaceable filter elements can experience the accumulation of contaminants within the reusable housings that cover the replaceable filter elements. If this occurs, the "clean" side of new filter elements inserted within the contaminated housings can immediately become contaminated. There is a need in the art to prevent this type of contamination from occurring.

SUMMARY OF THE INVENTION

One aspect of the present invention relates to a filter assembly including a replaceable filter cartridge for use with a reusable filter canister. The filter cartridge includes a cylindrical filter media having top and bottom ends respectively mounted within top and bottom end caps. The bottom end cap includes a sidewall that surrounds at least a lower portion of the filter media. A contaminant containment chamber is defined between the sidewall and an outer side of the filter media. A radial sealing element is located adjacent a top end of the sidewall. When the cartridge is mounted within the canister, the radial sealing element engages an inner surface of the canister to provide a circumferential seal. The sidewall also includes a living hinge positioned below the sealing element.

In use of the filter assembly, contaminants are accumulated on the outer side of the filter element. Larger contaminants fall downwardly and are captured in the contaminant containment chamber defined by the lower end cap. The radial sealing element prevents contaminants from by-passing the contaminant containment chamber. When the filter element is fully loaded with contaminants, the filter cartridge can be removed from the canister and replaced. The living hinge facilitates removal of the filter cartridge from the canister by reducing friction between the radial sealing element and the inner surface of the canister.

A variety of advantages of the invention will be set forth in part in the description that follows, and in part will be apparent from the description, or may be learned by practicing the invention. It is to be understood that both the foregoing general description and the following detailed description are illustrative and explanatory only and are not restrictive of the invention as claimed.

DETAILED DESCRIPTION

Reference will now be made in detail to preferred embodiments of the present invention that are illustrated in the accompanying drawings. Wherever possible, the same reference numbers will be used throughout the drawings to refer to the same or like parts.

Figure 1:
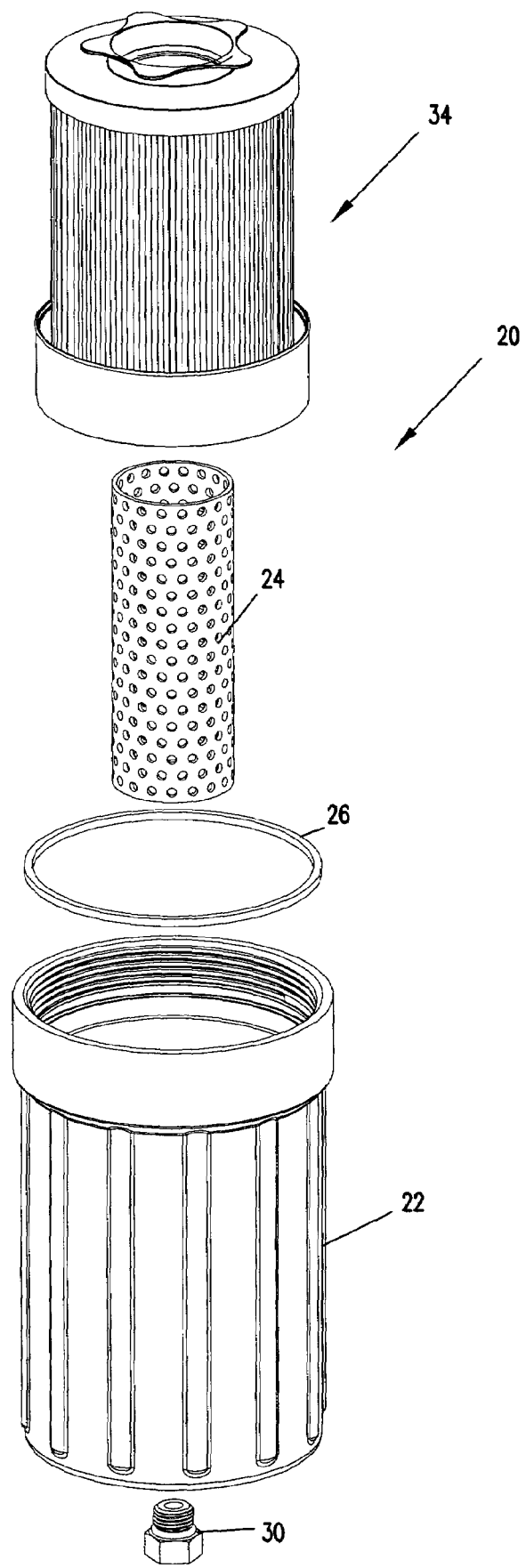
FIG. 1 is an exploded, perspective view of a filter assembly constructed in accordance with the principles of the present invention, the assembly includes a canister and a replaceable filter cartridge.

FIG. 1 shows an embodiment of a filter assembly 20 constructed in accordance with the principles of the present invention. The filter assembly 20 includes a reusable canister 22 (i.e., a bowl or housing) adapted for connection to a filter head 45 (shown in FIG. 2). The filter head 45 is part of a pressurized fluid/liquid system such as a fuel system, an engine lubrication system or a hydraulic oil system. The filter assembly 20 also includes a replaceable filter cartridge 34 that mounts within the canister 22. The filter cartridge 34 is adapted for filtering contaminants from the pressurized fluid/liquid system.

In use, the filter assembly 20 is connected to the filter head 45. Once connected, liquid from the pressurized system is directed from the filter head 45 to an outer side of the filter cartridge 34 (see arrows 200). From the outer side of the cartridge 34, the liquid flows through the filter cartridge 34 to an inner "clean" side of the filter cartridge 34 (see arrows 202). Contaminants within the liquid are accumulated on the outer "dirty" side of the filter cartridge 34. Filtered liquid from the "clean" side of the filter cartridge 34 is re-introduced into the pressurized system (see arrow 204).

Figure 2:
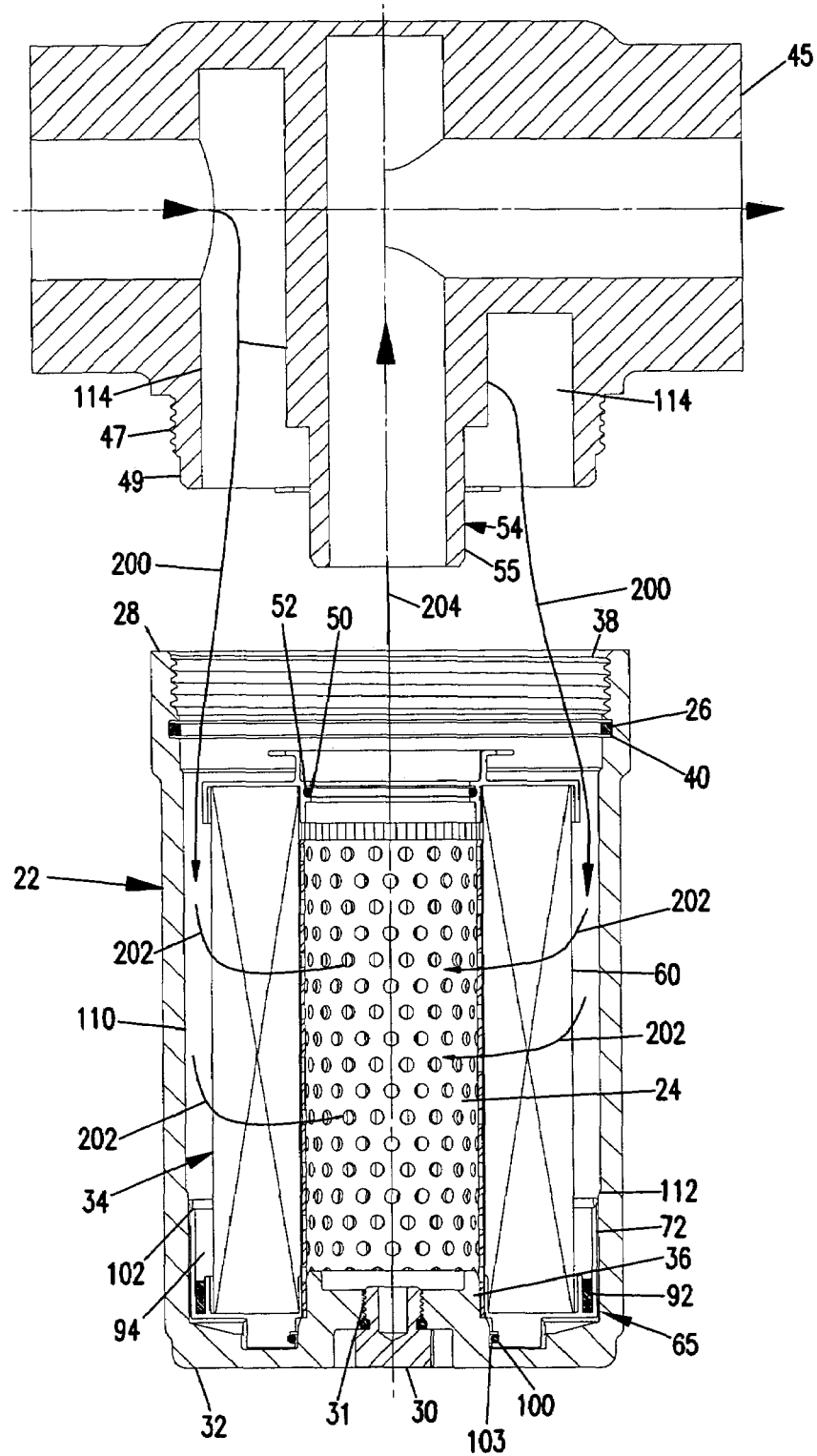
FIG. 2 is an assembled view of the filter assembly of FIG. 1 with the assembly being longitudinally bisected.

Referring to FIG. 1, the assembly 20 also includes a perforated core 24. As shown in FIG. 2, the core 24 is preferably fixably mounted within the canister 22. For example, the core 24 can be press fit over a cylindrical mounting post 36 formed at a bottom end 32 of the canister 22 (see FIG. 2). Adhesive can also be used to better secure the core 24 to the post 36. When assembled, as shown in FIG. 2, the filter cartridge 34 fits over the core 24 such that the core 24 provides radial reinforcement to the filter cartridge 34. The radial reinforcement provided by the core 24 prevents the filter cartridge 34 from collapsing radially inwardly during use.

Referring again to FIG. 1, the filter assembly 20 further includes an annular sealing member 26 (e.g., an O-ring) and drain plug 30. The annular sealing member 26 is preferably mounted adjacent a top end 28 of the canister 22 for providing a fluid tight seal with the filter head 45. The drain plug 30 is preferably threaded within a drain plug opening 31 (shown in FIG. 2) defined by the bottom end 32 of the canister 22.

The canister 22 is preferably a "spin-on" canister 22. By "spin-on", it is meant that the canister 22 is connected to the engine head 45 by spinning (i.e., twisting, turning or rotating) the canister 22. For example, as shown in FIG. 2, the canister 22 includes internal threads 38 that interlock with corresponding threads 47 defined by the filter head 45. The annular sealing member 26 of the canister 22 is preferably mounted within an annular recess 40 located directly beneath the threads 38. When the canister 22 is fully threaded on the filter head 45, the annular seal 26 preferably engages a cylindrical sealing surface 49 of the filter head 45 to provide a fluid tight seal. Still referring to FIG. 2, the filter assembly 20 also includes an inner, annular sealing member 50. The inner, annular sealing member 50 is mounted within an annular recess 52 defined by the filter cartridge 34. When the canister 22 is fully threaded on the filter head 45, a cylindrical extension 54 of the filter head 45 projects partially into the filter cartridge 34. The extension 54 includes a cylindrical sealing surface 55 that engages the annular sealing member 50 to provide a fluid tight seal.

Preferably, the canister 22 has a generally thin-walled construction and is formed from a metal such as aluminum, steel or other suitable material. The core 24 is also preferably made of a material such as steel or aluminum.

Figure 3A:
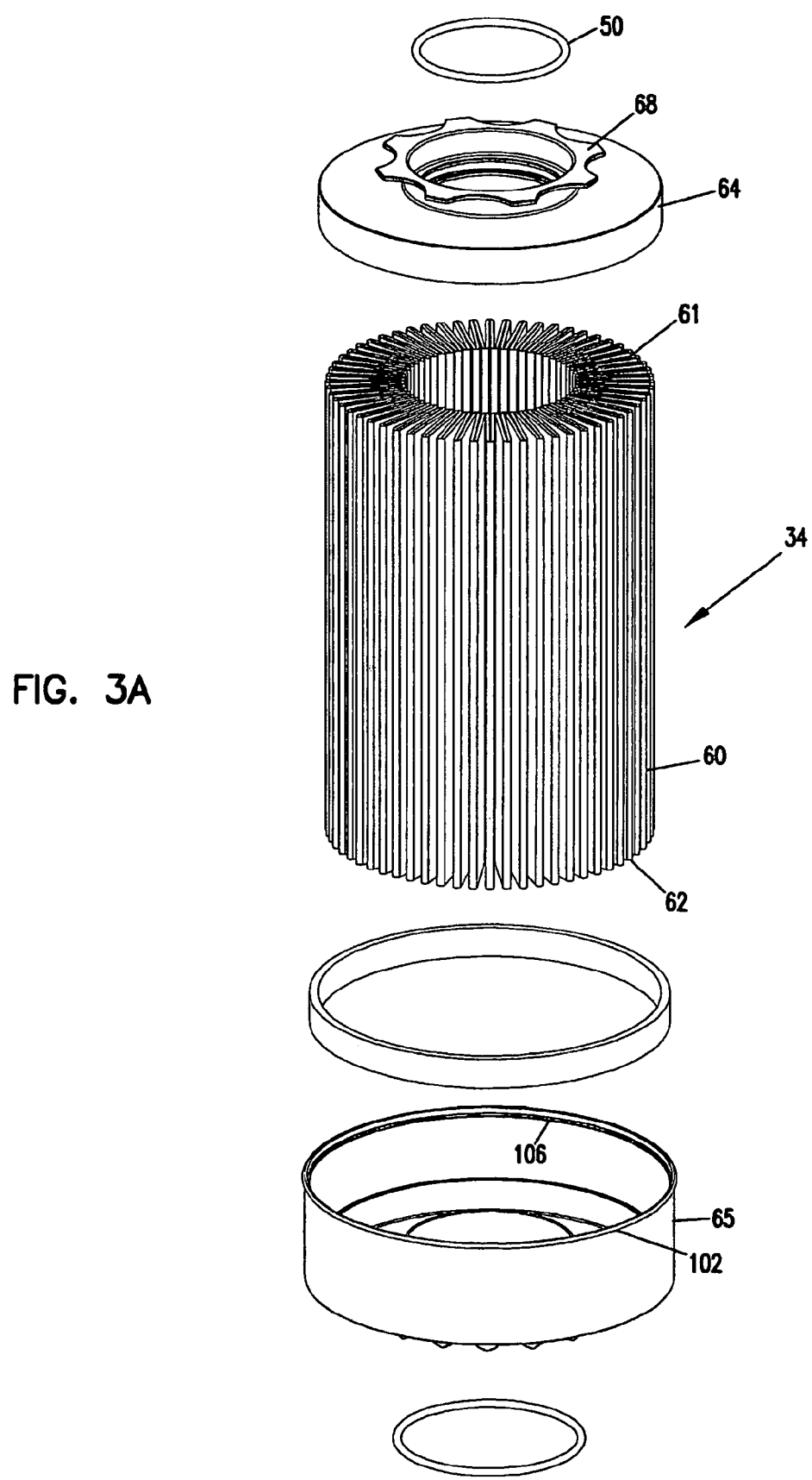
FIGS. 3A and 3B are exploded, perspective views of the filter cartridge of FIGS. 1 and 2.
Figure 3B:
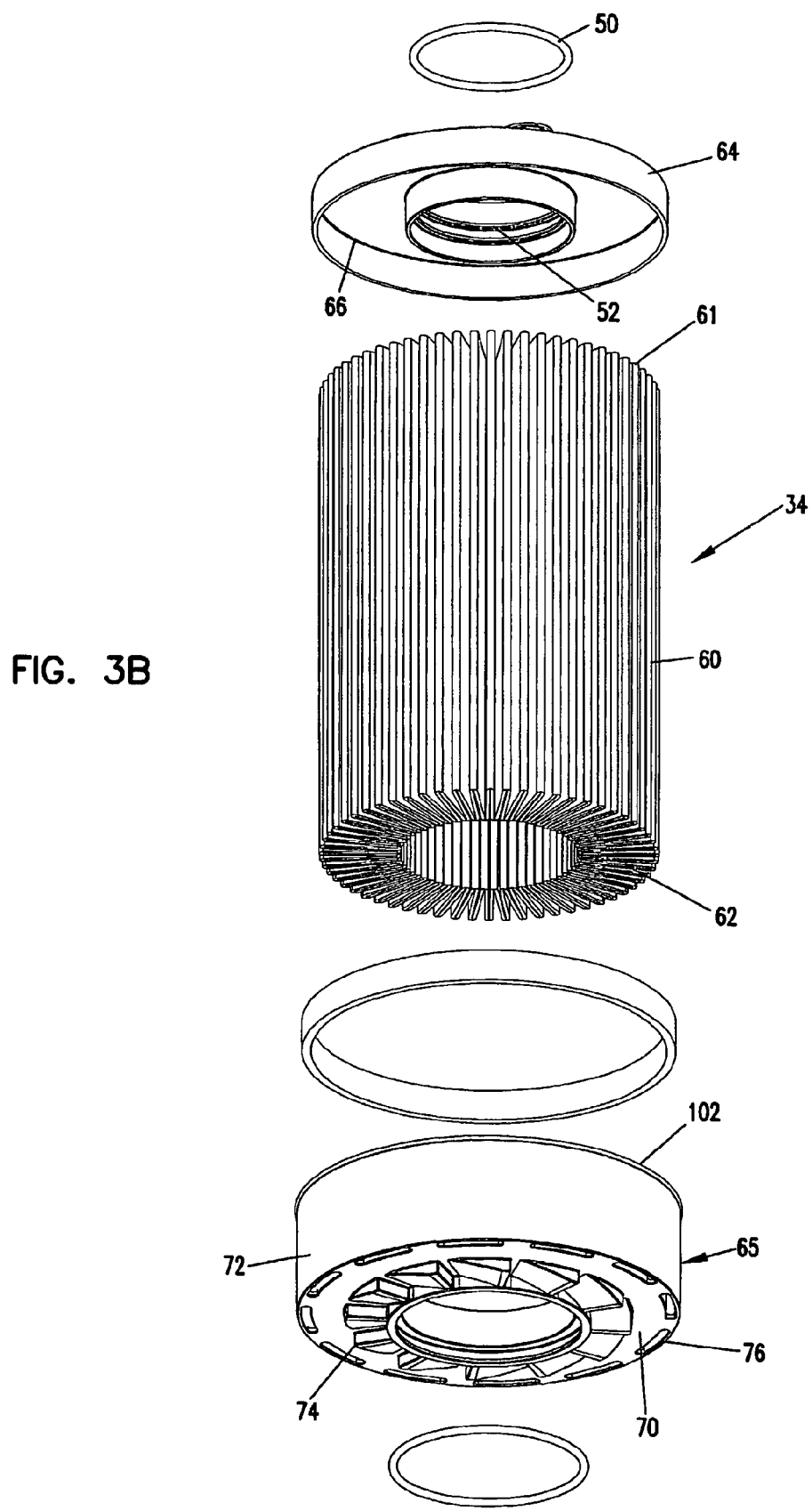

FIGS. 3A and 3B are exploded views of the filter cartridge 34. The filter cartridge 34 includes a cylindrical filter media 60 having top and bottom ends 61 and 62 respectively mounted within top and bottom end caps 64 and 65. A potting material (e.g., a material having adhesive characteristics such as urethane) can be used to seal and secure the top and bottom ends 61 and 62 in their respective end caps 64 and 65. The filter media 60 preferably has a pleated configuration. In certain embodiments, the filter media 60 can include a pleated paper media adapted for filtering liquids such as fuel, engine oil, hydraulic fluids or other liquid media. Exemplary types of filter media include sintered metal, cellulose, synthetic media, wire mesh, and glass fibers. Also, either pleated or unpleated filter media can be used.

Figure 4:
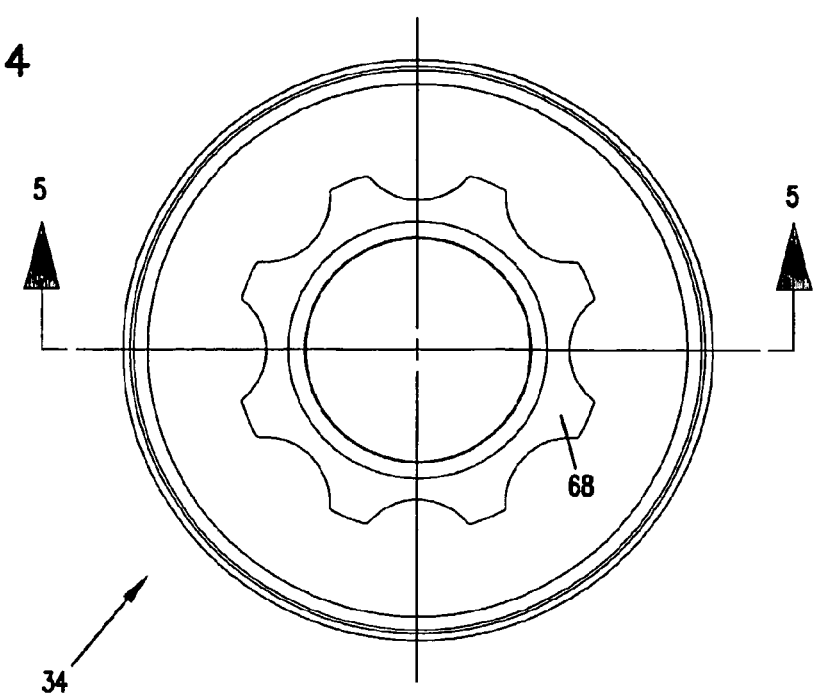
FIG. 4 is a top view of the filter cartridge of FIGS. 3A and 3B.

Referring to FIG. 3B, the top end cap 64 of the filter cartridge 34 includes an annular channel 66 sized to receive the top end 61 of the filter media 60. The top end cap 64 also preferably includes a handle 68 (best shown in FIGS. 3A and 4) for use in pulling the filter cartridge 34 from the canister 22 during the cartridge removal process. Further, the top end cap 64 preferably defines the annular recess 52 (shown in FIG. 2) for mounting the annular sealing member 50.

Figure 6:
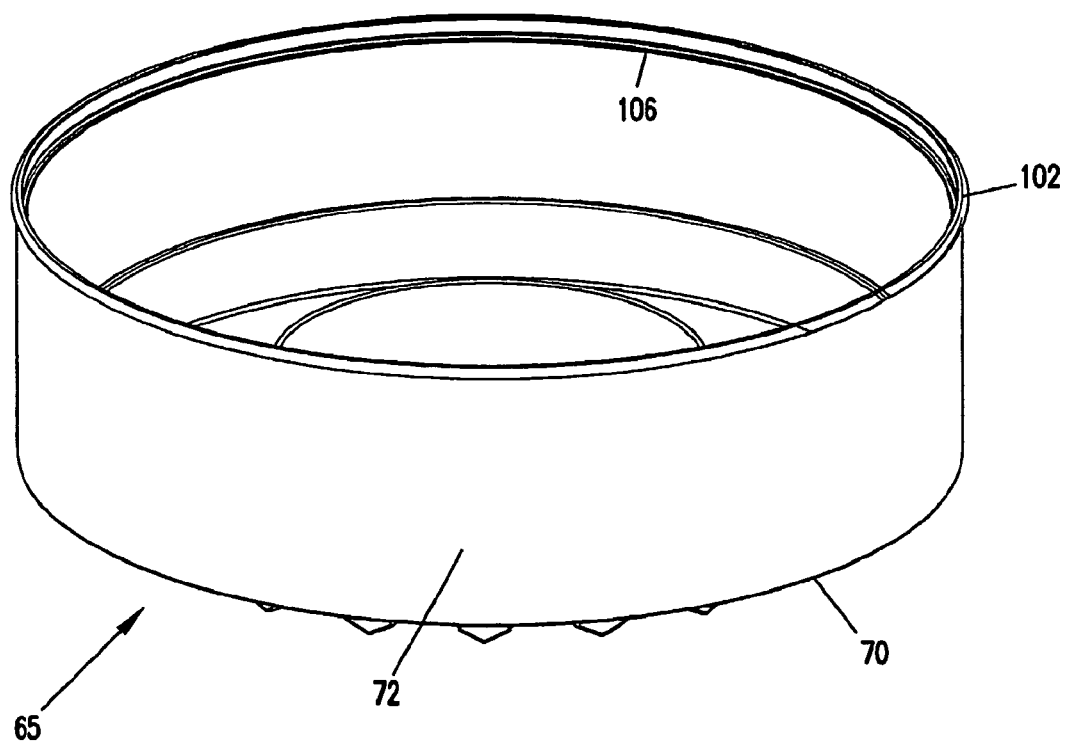
FIG. 6 is a top, perspective view of the bottom end cap of the filter cartridge of FIGS. 3A and 3B.
Figure 7:
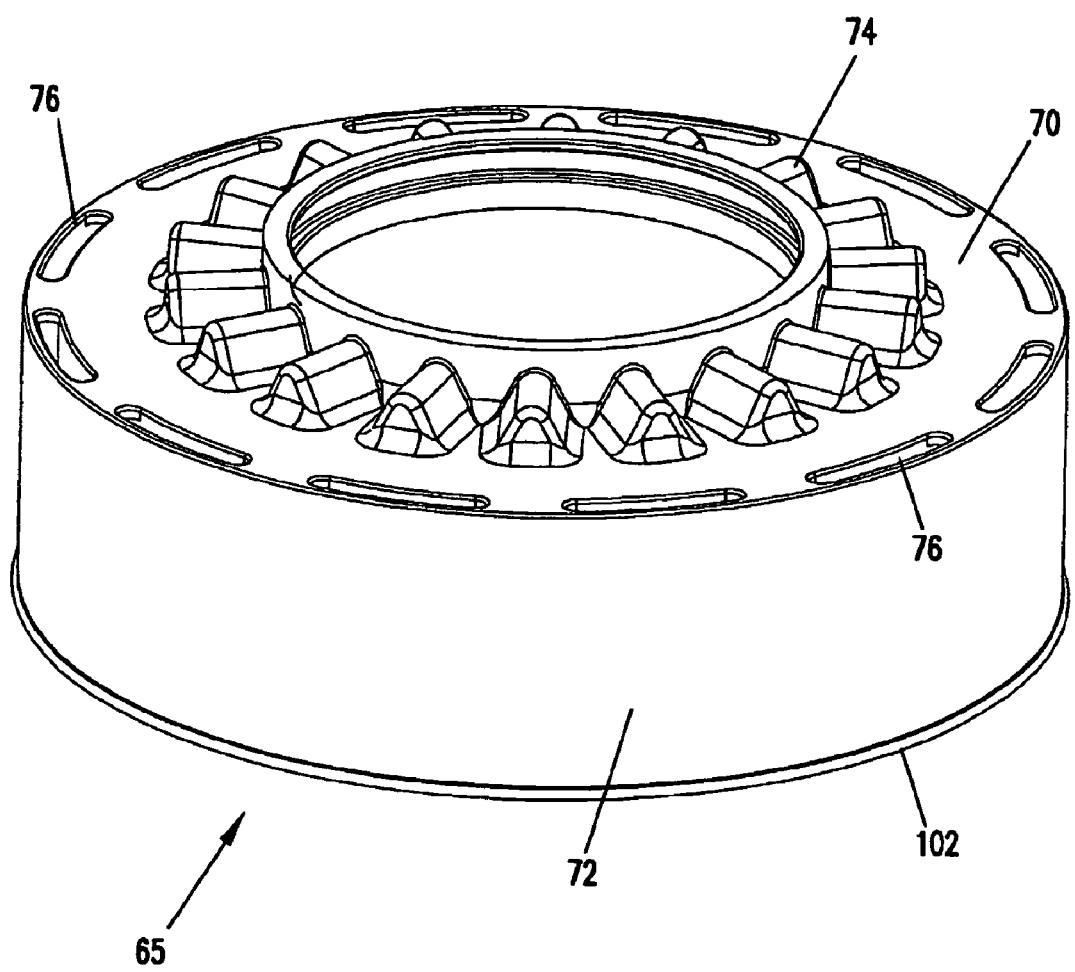
FIG. 7 is a bottom, perspective view of the bottom end cap of FIG. 6.

Referring to FIGS. 6 and 7, the bottom end cap 65 of the filter cartridge 34 preferably includes a bottom wall 70 and a circumferential sidewall 72 that projects upwardly from the bottom wall 70. The bottom end cap 65 is preferably made of a plastic material such as glass-filled nylon. Preferably, the bottom end wall 70 and the sidewall 72 are integrally formed as a single unitary piece. In the depicted embodiment, the sidewall 72 is preferably made of a material that is impervious to liquids (e.g., hydraulic oil).

Referring to FIG. 7, the bottom wall 70 is preferably generally planar. A plurality of interlock members 74 project outwardly from the bottom side of the bottom wall 70. The interlock members 74 are adapted to engage corresponding interlock members formed in the bottom of the canister 22 to prevent relative rotation between the canister 22 and the filter cartridge 34. Further details relating to the interlock members 74 can be found in Application Ser. No. 60/280,786 entitled, BOWL-CARTRIDGE FILTER HAVING INTERLOCK MECHANISM AND METHODS, which was filed on Apr. 2, 2001, and which is hereby incorporated by reference in its entirety.

Figure 8:
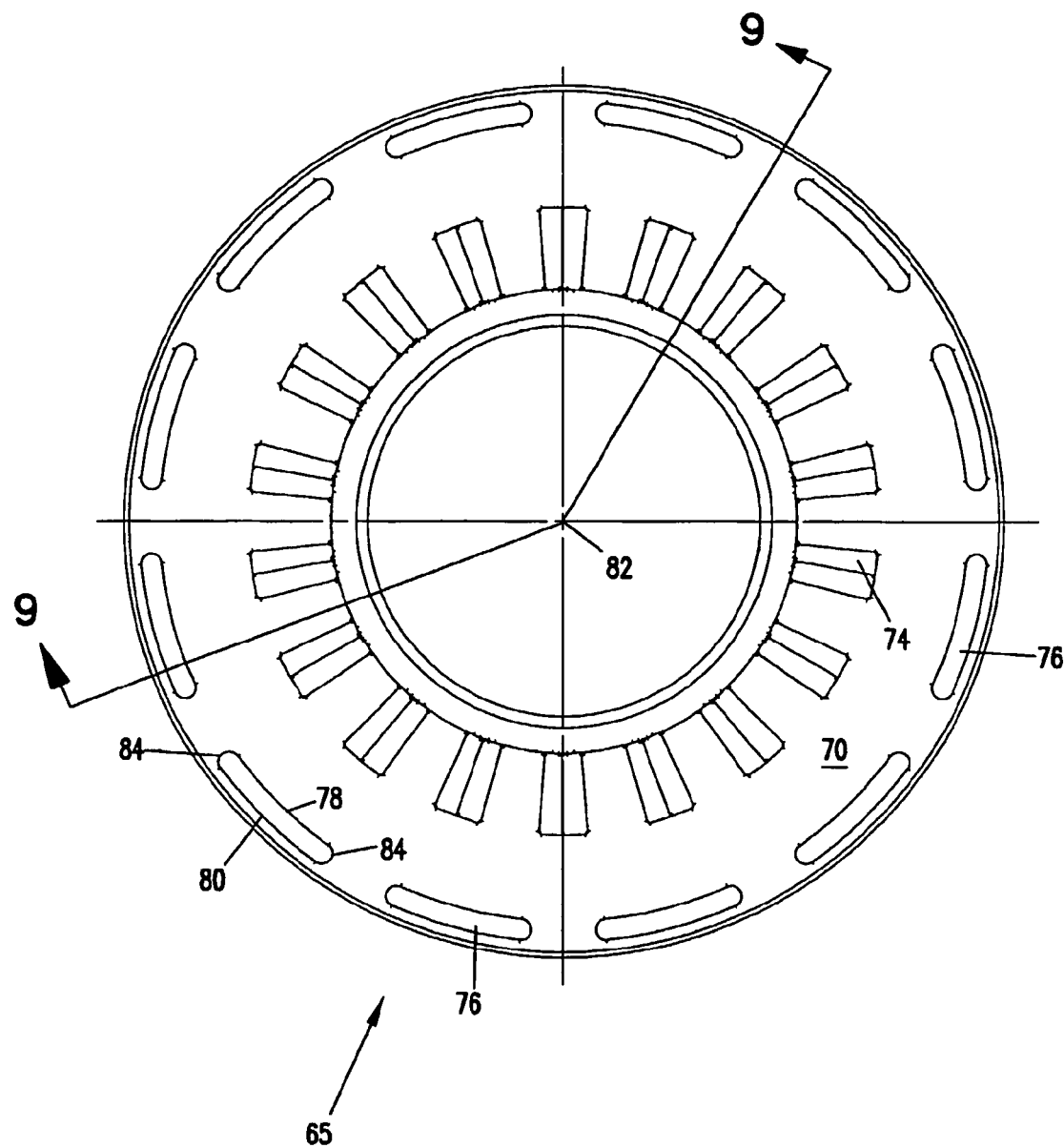
FIG. 8 is bottom, plan View of the bottom end cap of FIG. 6.

Referring still to FIG. 7, the bottom wall 70 also defines a plurality of drain openings 76. As best shown in FIG. 8, each of the drain openings 76 is preferably elongated in a circumferential direction. The drain openings 76 are positioned near the side wall 72. Inner and outer sides 78 and 80 of the drain openings 76 are defined by arcs swung about a center 82 of the bottom end cap 62. Ends 84 of the drain openings 76 are preferably rounded.

Figure 5:
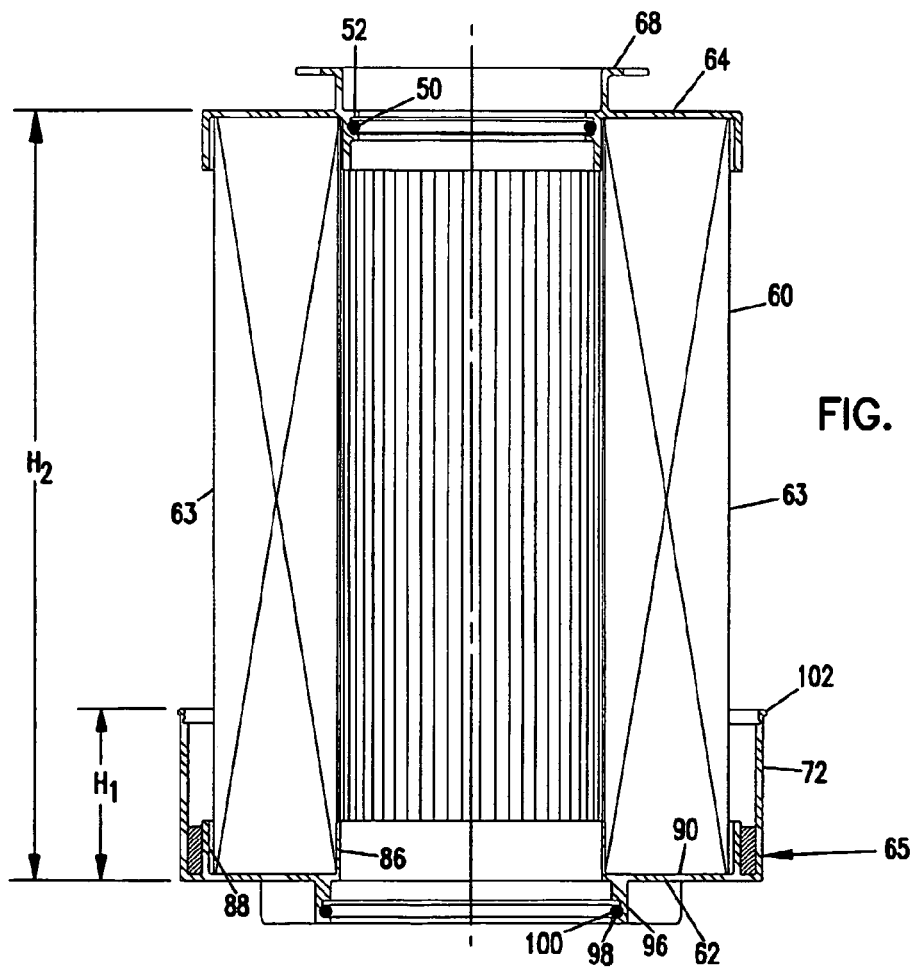
FIG. 5 is a cross-sectional view taken along sectional line 5-5 of FIG. 4.

Referring to FIG. 5, the sidewall 72 of the bottom end cap 65 preferably surrounds at least a lower portion of the filter media 60. Preferably, the sidewall 72 has a height $H_1$ that is relatively short as compared to a total height $H_2$ of the filter media 60. In a preferred embodiment, the height $H_1$ of the sidewall 72 is less than one-third the height $H_2$ of the entire filter media 60. The bottom wall 70 and the sidewall 72 of the bottom end cap 65 cooperate to form a cup-like structure. In certain embodiments (e.g., a filter assembly with a 100 millimeter diameter), a spacing gap g of approximately 5-6 millimeters is formed between the cylindrical sidewall 72 and an outer side 63 of the filter media 60. A contaminant containment chamber 94 is defined in the region located between the sidewall 72 and the filter media 60.

Figure 9:
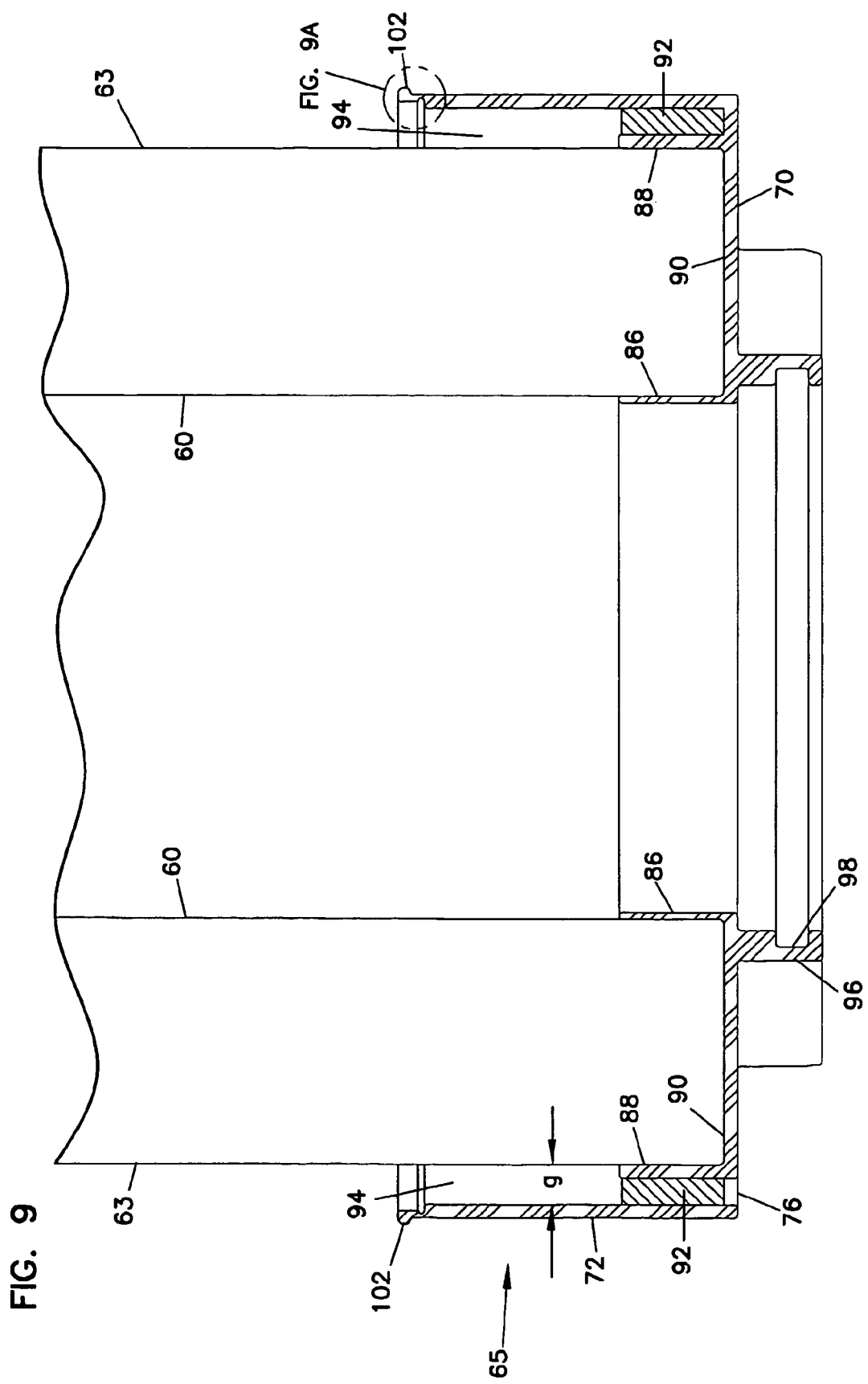
FIG. 9 is a cross-sectional view taken along section line 9-9 of FIG. 8.

Referring to FIG. 9, the bottom end cap 65 includes inner and outer annular flanges 86 and 88 that project upwardly from the bottom wall 70. The inner and outer flanges 86 and 88 cooperate to define an annular channel 90 for receiving the bottom end 62 of the filter media 60 (see FIG. 5). The outer flange 88 is spaced radially inwardly from the sidewall 72 of the bottom end cap 65. A ring-shaped outer filter media 92 is preferably mounted in the region between the outer flange 88 and the sidewall 72. The drain openings 76 defined through the bottom wall 70 of the bottom end cap 65 are located directly beneath the outer filter media 92. The filter media 92 is preferably made of a material such as synthetic fibrous mesh (e.g., SYNTEC® brand media sold Donaldson Company, Inc.). The filter media 92 is preferably mounted so as to pre-filter any liquid that exits the containment chamber 94 through the drain openings 76. Preferably, contaminant particles (e.g., dirt, metal, etc.) having diameters greater 2 microns, or in the range of 2-50 microns, are retained in the chamber 94. In an alternative embodiment, particles sized larger than 0.5 microns are captured.

Still referring to FIG. 9, a lower annular extension 96 preferably projects downwardly from the bottom wall 70 of the bottom end cap 65. The lower annular extension 96 defines an inner recess 98 for mounting an annular sealing member 100 (shown in FIG. 5). As best shown in FIG. 2, when the cartridge 34 is mounted within the canister 22, the annular sealing member 100 is adapted to provide a fluid tight seal with a lower portion 103 of the mounting post 36 located at the bottom end 32 of the canister 22.

Figure 9A:
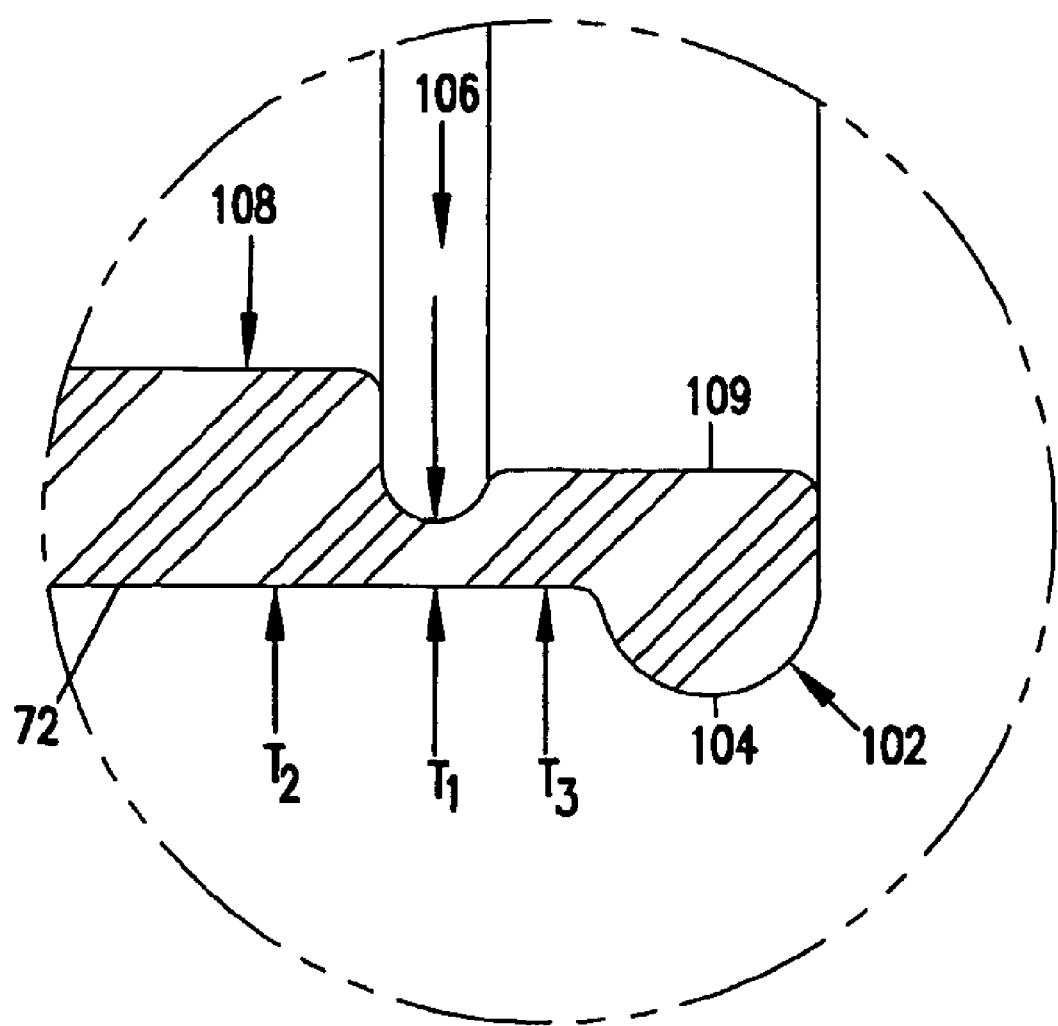
FIG. 9A is a detailed view of FIG. 9 showing a living hinge defined by a sidewall of the bottom end cap.

Referring once again to FIG. 9, the sidewall 72 defines a primary outer diameter. An upper sealing element 102 projects radially outward from the side wall 72 so as to define a secondary outer diameter. Preferably, the upper sealing element 102 is integrally formed as a single, unitary piece with the side wall 72. Preferably, the upper sealing element 102 extends circumferentially about the entire circumference of the side wall 72. As best shown in FIG. 9A, an outermost surface 104 of the upper sealing element 102 is generally rounded such that the sealing element 102 has a generally semi-circular cross-section.

Looking again to FIG. 9A, a "living hinge" 106 is defined by the sidewall 72 at a region directly below the upper sealing element 102. The term "living hinge" will be understood to mean a hinge-like structure providing a region of increased flexibility where the sidewall is predisposed to bend or flex. For example, as shown in FIG. 9A, the living hinge 106 is formed by a region of reduced cross-sectional thickness. For example, the hinge 106 is shown having a radial thickness $T_1$ which is less than a primary radial thickness $T_2$ of the sidewall 72 and is also less than a secondary radial thickness $T_3$ of the sidewall 72. The primary radial thickness $T_2$ is located below the living hinge 106 and the secondary radial thickness $T_3$ is located above the living hinge 106. Preferably, the primary radial thickness $T_2$ is greater than the secondary radial thickness $T_3$. In one embodiment, the thickness $T_1$ is less than or equal to one half the primary thickness $T_2$. In another non-limiting embodiment, the thickness $T_1$ is about 0.25 millimeter (mm), the thickness $T_2$ is about 1 mm and the thickness $T_3$ is about 0.5 mm.

The living hinge 106 is preferably provided by a rounded notch defined in the inner surface of the sidewall 72. The notch preferably has a generally semi-circular cross-section. The notch preferably extends about the entire inner circumference of the sidewall 72. The portion of the sidewall 72 defining the secondary thickness $T_3$ defines a circumferential inner surface 109 that is stepped radially outwardly relative to a corresponding inner circumferential surface 108 of the portion of the sidewall 72 defining the primary thickness $T_2$.

In use, the filter cartridge 34 is mounted within the canister 22 as shown in FIG. 2. As so mounted, the cartridge 34 fits over the core 24 and the lower annular sealing member 100 forms a fluid tight seal with the bottom end 32 of the canister 22. Also, the upper sealing element 102 of the bottom end cap 65 engages an inner surface 110 of the canister 22 to form a radial seal therewith. The inner surface 110 of the canister 22 includes a radial taper 112 for enhancing this radial seal. Further, as described above, the sealing members 26 and 50 form annular seals between the filter head 45 and the filter assembly 20.

In use, oil from the filter head 45 enters the filter assembly 20 through openings 114. From the openings 114, the oil flows into the region between the filter media 60 and the inner surface 110 of the canister 22. The oil than flows radially inwardly through the filter media 60 and also through the perforated core 24. The filtered oil exits the filter assembly 20 by flowing upwardly through the core 24 back into the filter head 45. Contaminants filtered by the filter media 60 are retained on the outer surface of the filter media 60. Heavier contaminants move downwardly into the contamination chamber 94 defined between the sidewall 72 of the bottom end cap 65. During filtration, the upper sealing element 102 prevents contaminants from accumulating at the bottom of the canister 22 by preventing the contaminants from migrating between the sidewall 72 and the inner surface of the canister 22. Instead, the contaminants are directed into the contaminant chamber 94.

When the filter media 60 becomes loaded with contaminants, the canister 22 can be unthreaded from the filter head 45 to provide access to the filter cartridge 34. After the canister 22 has been unthreaded, the filter cartridge 34 is pulled axially from the canister 22. The living hinge 106 reduces the sealing pressure that exists between the upper sealing element 102 and the inner surface of the canister 22. Thus, the filter cartridge 34 can be pulled from the canister 22 with minimal resistance.

As the filter cartridge 34 is removed from the canister 22, some of the unfiltered fluid within the containment chamber 94 flows downwardly through the annular filter 92 and is drained into the canister 22 through the drainage openings 76. The remainder of the unfiltered hydraulic fluid flows through the filter element 60 and drains into the canister 22 through a central bottom opening defined by the bottom end cap 65. Regardless of the flow path, the unfiltered hydraulic fluid within the annular flow contaminant containment chamber 94 is filtered prior to being drained into the canister 22. Consequently, only clean, filtered fluid is drained into the canister 22. The contaminants are fully contained within the chamber 94, and are discarded with the filter cartridge 34. In this manner, a new filter cartridge inserted within the canister 22 will not be contaminated by the fluid present in the canister 22.

FIGS. 10-14 illustrate another bottom end cap 65' that is an embodiment of the present invention. The bottom end cap 65' includes an annular flange 88' surrounded by an outer side wall 72'. A containment chamber 94' is defined between the flange 88' and the side wall 72' (see FIG. 13). The containment chamber 94' is adapted for receiving an annular secondary filter such as filter 92 shown in FIG. 9. Drain openings 76' (see FIG. 11) are defined through the bottom of the bottom end cap 65' to allow fluid to drain from the containment chamber 94'.

Figure 10:
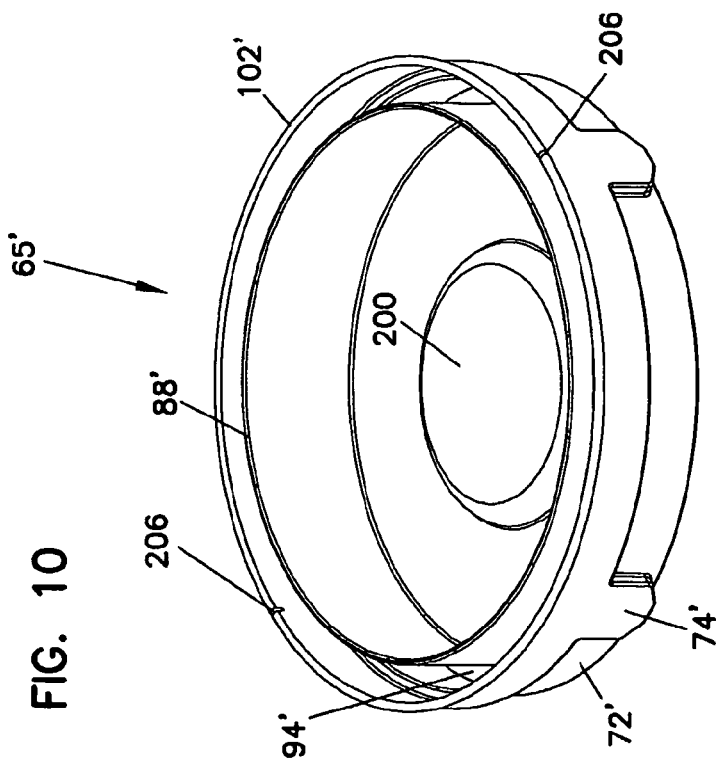
FIG. 10 is a top, perspective view of an alternative bottom end cap that is an embodiment of the present invention.
Figure 11:
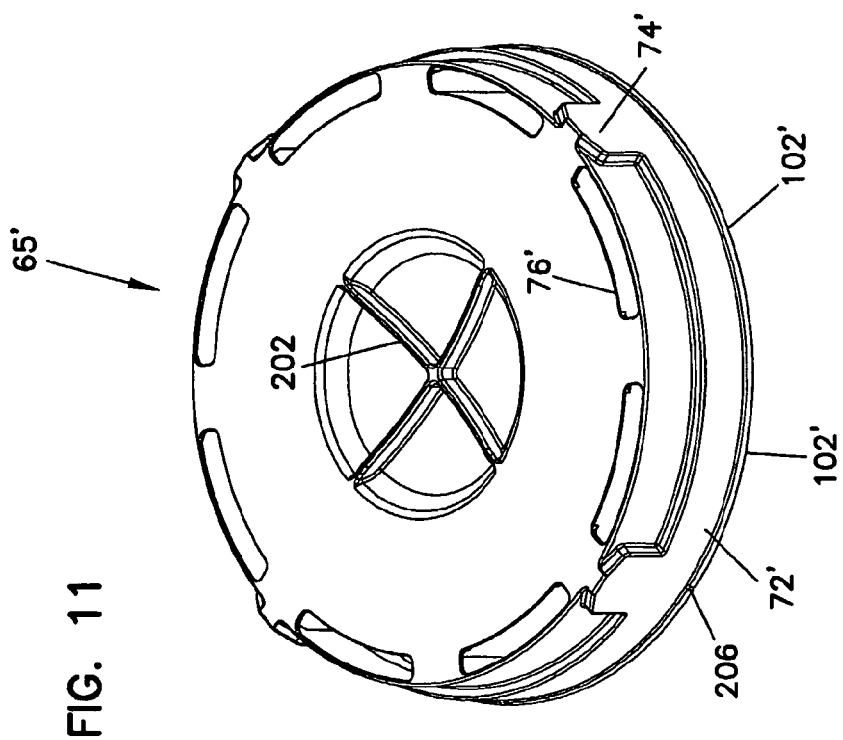
FIG. 11 is a bottom, perspective view of the bottom end cap of FIG. 10.
Figure 12:
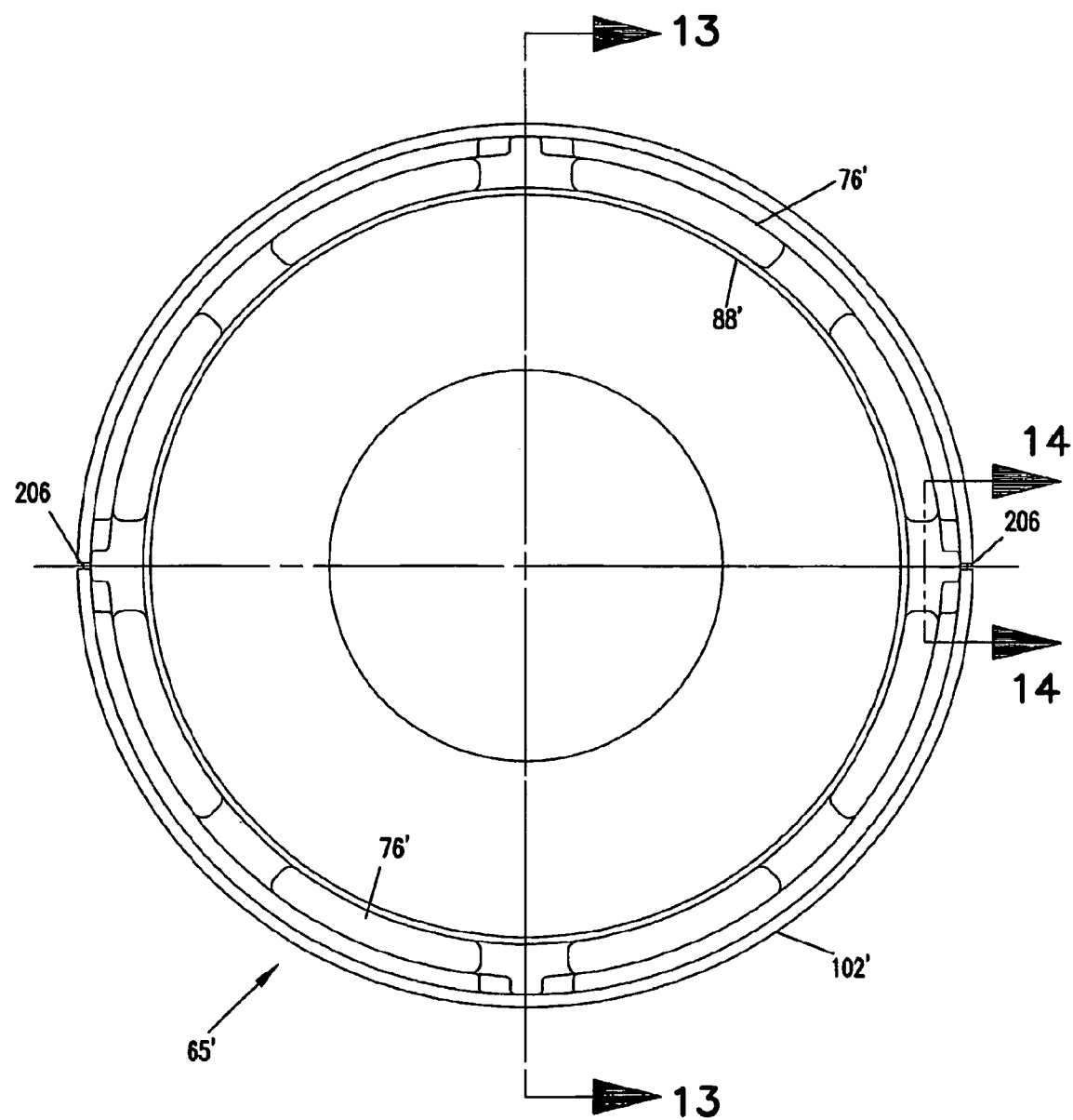
FIG. 12 is a top plan view of the bottom end cap of FIG. 10.
Figure 13:
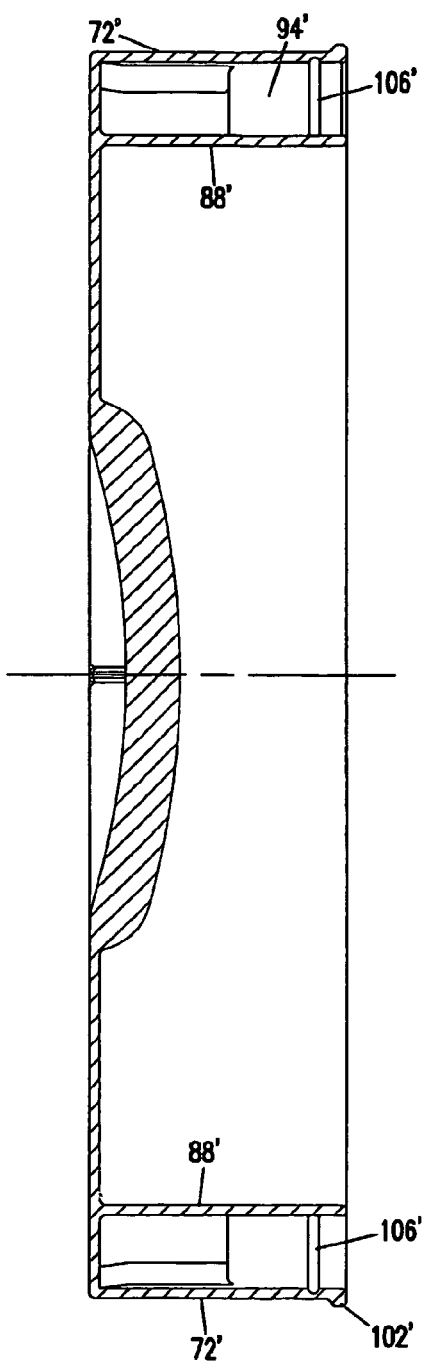
FIG. 13 is a cross-sectional view taken along section line 13-13 of FIG. 12.

Referring to FIG. 10, the upper side of the bottom end cap 65' defines a central hub or post 200 adapted to fit inside the cylindrical filter media such as the filter media 60 shown in FIG. 3B. Ribs 202 (shown in FIG. 11) are provided on the under side of the hub 200 for reinforcing the hub to prevent the hub from deforming in response to pressure differentials. As shown in FIGS. 10 and 11, the bottom end cap 65' also includes interlock members 74' positioned at the side wall 72'. The interlock members 74' are adapted to fit within corresponding interlock recesses defined within a corresponding canister.

Referring still to FIGS. 10 and 11, the uppermost edge of the side wall 72' includes a circumferential sealing element 102' having generally the same configuration as sealing element 102. A circumferential living hinge 106' is defined by the side wall 72' directly below the circumferential sealing element 102'. To further improve the flexibility of the circumferential sealing element 102', the circumferential sealing element 102' preferably defines at least one relief notch 206 for preventing the sealing element 102 from puckering or buckling when the bottom end cap 65' is inserted within its corresponding canister. In one embodiment, two of the relief notches 206 are defined through the sealing element 102'. Preferably, the two relief notches 206 are uniformly spaced about the circumference of the sealing element 102' so as to be approximately 180° apart. In another embodiment, four relief notches can be defined through the sealing element 102. In this embodiment, the relief notches are preferably spaced approximately 90° apart about the circumference of the sealing element 102'.

Figure 14:
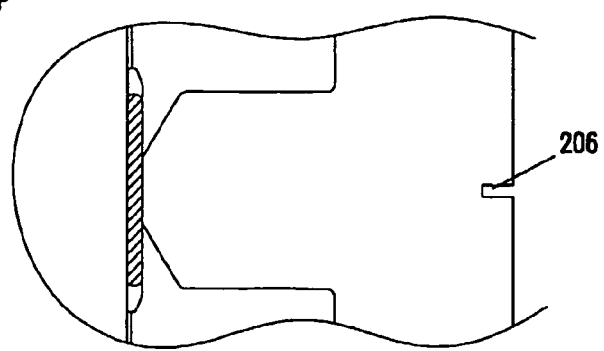
FIG. 14 is a cross-sectional view taken along section line 14-14 of FIG. 12.

FIG. 14 shows one representative notch configuration for the relief notches 206. In this configuration, the relief notch 206 includes two opposing, generally parallel walls that extend vertically downwardly from the uppermost portion of the sealing element 102'. The vertical walls intersect with a transverse wall that interconnects the two vertical walls. Thus, the depicted notch has a generally rectangular shape. However, it will be appreciated that notches of other shapes could also be used. In one embodiment, the spacing between the opposing walls of the notch is in the range of 0.01 to 0.05 inches, and the depth of the notch is in the range of 0.04 to 0.012 inches.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A filter cartridge comprising:
   a filter media having a top end and a bottom end;
   a top end cap mounted at the top end of the filter media;
   a bottom end cap mounted at the bottom end of the filter media, the bottom end cap including a bottom wall and a side wall, the side wall extending upwardly from the bottom wall and surrounding at least a lower portion of the filter media, the side wall having a top end;
   a circumferential sealing element that projects radially outwardly from the side wall at a location adjacent the top end of the side wall; and
   a circumferential living hinge defined by the side wall at a location below the circumferential sealing element, wherein the living hinge is formed by a ring of reduced cross sectional thickness provided at the side wall, the ring of reduced cross sectional thickness being provided by a circumferential notch defined within the side wall below the circumferential sealing element, the circumferential notch having an open side that faces in a radial direction relative to a central axis of the filter cartridge.

2. The filter cartridge of claim 1, wherein the side wall is spaced from an outer surface of the filter media such that a contaminant containment chamber is defined between the side wall and the filter media.

3. The filter cartridge of claim 2, wherein the bottom wall defines a plurality drain openings located beneath the contaminant containment chamber.

4. The filter cartridge of claim 3, further comprising an outer filter element for filtering liquid that drains from the contaminant containment chamber through the drain openings.

5. The filter cartridge of claim 4, wherein the outer filter element is annular and is mounted at a bottom of the contaminant containment chamber.

6. The filter cartridge of claim 1, wherein the notch has a generally semi-circular cross-section.

7. The filter cartridge of claim 1, wherein the notch is defined in an inner surface of the side wall.

8. The filter cartridge of claim 1, further comprising at least one relief notch defined through the sealing element.

9. The filter cartridge of claim 8, further comprising a plurality of relief notches defined through the sealing element.

10. The filter cartridge of claim 9, wherein the relief notches are uniformly spaced about the circumference of the sealing element.

11. The filter element of claim 10, wherein the relief notches include two relief notches spaced apart approximately 180 degrees about the circumference of the sealing element.

12. The filter element of claim 1, wherein the circumferential sealing element is integral to the sidewall.

13. A filter cartridge comprising:
   a filter media having a top end and a bottom end;
   a top end cap mounted at the top end of the filter media;
   a bottom end cap mounted at the bottom end of the filter media, the bottom end cap including a bottom wall and a side wall, the side wall extending upwardly from the bottom wall and surrounding at least a lower portion of the filter media, the side wall having a top end;
   a circumferential sealing element that projects radially outwardly from the side wall at a location adjacent the top end of the side wall; and
   a circumferential living hinge defined by a circumferential notch defined within the side wall at a location between the circumferential sealing element and the bottom wall, wherein the living hinge is formed by a ring of reduced cross,sectional thickness provided at the side wall; and
   wherein the side wall has a primary radial thickness below the circumferential notch, a secondary radial thickness above the circumferential notch, and a hinge radial thickness at the circumferential notch, the primary radial thickness being thicker than the secondary radial thickness and the secondary radial thickness being thicker than the hinge radial thickness.

14. The filter cartridge of claim 13, wherein the side wall is substantially vertical as the side wall extends from the bottom end to the top end.

15. The filter cartridge of claim 14, wherein the sealing member is integral with the side wall and has a semi circular cross-section.

* * * * *